April 19, 1966 YOSHIO TOMITA ETAL 3,247,329
DEVICE FOR STABILIZING CONTACT BETWEEN A MAGNETIC
HEAD AND A MAGNETIC TAPE
Filed June 4, 1962

INVENTORS
Yoshio Tomita
Yoshiyo Wada
Yoshiro Nishiwaki
By Stevens, Davis, Miller & Mosher
ATTORNEYS United States Patent Office 3,247,329
Patented Apr. 19, 1966

3,247,329

DEVICE FOR STABILIZING CONTACT BETWEEN A MAGNETIC HEAD AND A MAGNETIC TAPE

Yoshio Tomita, Setagaya-ku, Tokyo, Yoshiyo Wada, Kawasaki, and Yoshiro Nishiwaki, Yokohama, Japan, assignors to Victor Company of Japan, Limited, Yokohama, Japan, a corporation of Japan Filed June 4, 1962, Ser. No. 199,951
Claims priority, application Japan, July 10, 1961, 36/24,039
2 Claims. (Cl. 179—100.2)

The present invention is drawn to a device for stabilizing contact between a magnetic head and a magnetic tape comprising a magnetic head, magnetic tape, and means for stablizing the contact between the magnetic head and the magnetic tape. More particularly the present invention sets forth devices for recording one field of the television video signal and other signals on a magnetic tape by scanning along a sufficiently long loci on the magnetic tape by means of a magnetic head and replaying the signals thus recorded by means of the above mentioned magnetic head or other magnetic heads. Furthermore, the device of the present invention comprises means for stabilizing the contact between the magnetic head and the magnetic tape so that variations of the relative tape and head relation, such as instantaneous speed and pressure between the magnetic head and the magnetic tape, are prevented.

An object of the invention is to normalize the tension of the magnetic tape and maintain a constant relative relation between the magnetic head and the magnetic tape, thereby preventing such relative relation from being varied.

For a better understanding of the invention reference is taken to the accompanying drawings, in which, FIG. 1 diagrammatically illustrates one example of a conventional magnetic recording and replaying device which can incorporate the present invention;

FIGS. 3*a* and 3*b* are similar plan views of a part of two embodiments of the device according to this invention, respectively.

Figure 1:
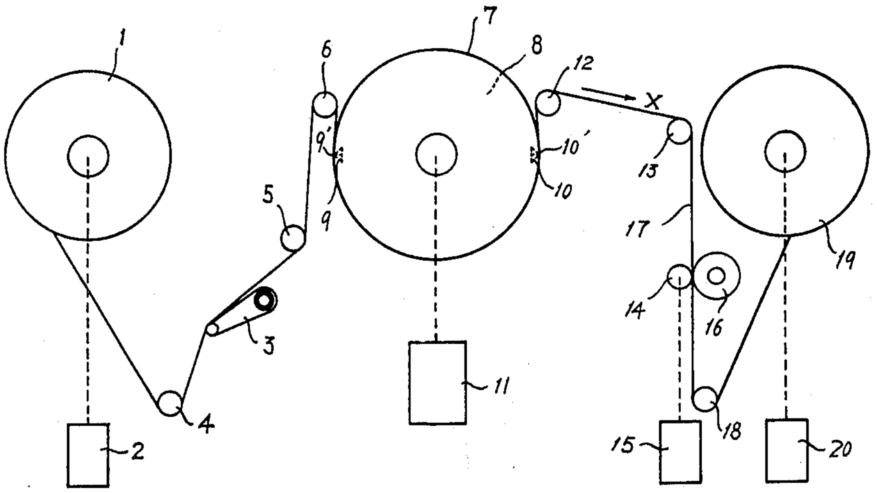
FIG. 1 shows one example of a conventional magnetic recording and replaying system.

In the drawing, 1 designates a supply reel, 2 a reel motor directly connected to said supply reel 1, 3 a tension arm, 4, 5, 6 guide rollers, 7 guide drums, and 8 a rotating disc placed between said said guide drums 7 and having an outside diameter which is smaller than that of said guide drums 7. The rotating disc 8 is provided on its outer peripheral surface with magnetic heads 9, 10. Head tips 9′, 10′ of the magnetic heads 9, 10 project from the outer perpiheral surface of the rotating disc 8 arranged between the opposed end plates of the guide drums 7. 11 is a head motor for driving said rotating disc 8. 12, 13 are guide rollers. 14 is a capstan adapted to be driven by a capstan motor 15. 16 is a pinch roller for pressing a magnetic tape 17 against the capstan 14. 18 is a guide roller, 19 a winding reel, and 20 a reel motor for driving said winding reel 19.

The operation of the above mentioned device is as follows:

The magnetic tape 17 is loaded as shown in FIG. 1. When the capstan 14 is driven by the capstan motor 15, the magnetic tape 17 is fed in a direction shown by an arrow X. If the rotating disc 8 and the winding reel 19 are rotated in given directions, respectively, the head tips 9′, 10′ of the magnetic heads 9, 10 successively scan the magnetic tape 17 and recording or replaying thereon can be effected by means of the magnetic heads 9, 10.

In the above mentioned device the head tips 9′, 10′ arranged between the rims of end plates of the guide drums 7 make contact with the magnetic tape 17.

Figures 2, 3:
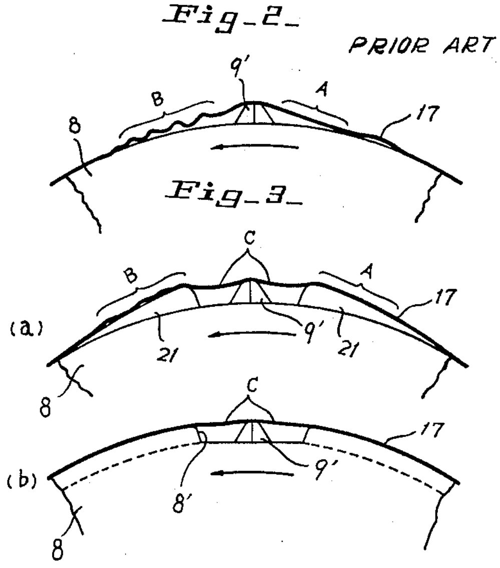
Fig. 2 PRIOR ART, Fig. 3
FIG. 2 is an enlarged plan view of a part of the conventional prior art device showing the contact between a head tip and a magnetic tape.

In the prior art device of FIGURE 2, a part A of the magnetic tape 17 is tightened into a straight line by means of the head tip 9′, while the part B becomes loose to form wave-like ripples. Owing to variations of such slackened part B the instantaneous relative speed and the contact pressure produced between the head tip 9′ and the magnetic tape 17 result in the instantaneous change in the phase and level of the reproduced signals. Such unwanted results may be reduced by increasing the tension of the magnetic tape 17. But such a solution, however, is limited by the fact that the tension of the magnetic tape 17 causes elongation thereof.

The present invention is intended to obviate the above disadvantages and problems. Two embodiments of the present invention will hereinafter be described with reference to FIGURES 3*a* and 3*b*. As above mentioned, the essentials of the invention are pertinent to the relative movement of the head tip with respect to the magnetic tape and the other parts of the device are similar to those of the above prior art device, so that only the part where the head tip makes contact with the magnetic tape need be described. The similar parts of the present device are designated by the same reference numerals as those of the above prior art device and the description on those well known parts is omitted.

In a first embodiment shown in FIG. 3*a*, provision is made of guide wenders 21 projected at each side of the head tip 9′ and separated a short distance therefrom. The guide wenders 21 are secured to the outer periphery of the rotating disc 8 and serve to gradually elevate the part B of the magnetic tape 17 to form a straight line portion C. Without the guide wenders 21 the portion B might be slackened to form ripples. In this straight line portion C, the head tip 9′ makes contact with the magnetic tape 17.

FIG. 3*b* shows a second embodiment of the invention in which the outer diameter of the rotating disc 8 is made a little larger than that of the guide drum 7 instead of providing the guide wenders 21 as shown in FIG. 3*a*. The parts of the rotating disc 8 where the magnetic heads 9, 10 are to be secured are provided with recesses 8′ near each side of the head tip 9′ to form the straight line portion C. The head tips 9′ are projected from the base surface of the recesses 8′ to make contact with the straight line portion C of the magnetic tape 17 similar to the above mentioned first embodiment.

As above explained in detail, according to the invention the guide wenders provided near the head tip prevent the magnetic tape from forming harmful loose wave-like ripples and the portion of the magnetic tape across the guide wenders is made straight, thereby normalizing the tension of the magnetic tape. Thus, the desired object of the invention can be attained.

Various other modifications may be made without departing from the spirit of the invention.

What we claim is:

1. A tape system including a device for stabilizing contact of a magnetic head with the magnetic tape comprising a rotary body being freely rotatable in fixed guide drum means having an outer peripheral edge for guiding the tape, said rotary body having an outer diameter which is smaller than that of said guide drum means, a magnetic head being mounted on the peripheral edge of said rotary body and an outer tip of said magnetic head elevated to substantially the outer peripheral edge of said guide drum means so as to contact said tape which is guided by said guide drum means, and guide means mounted on the outer peripheral edge of said rotary body arranged near the tip of said magnetic head in a rotary direction of said rotary body, end portions of said guide means being elevated to substantially the outer peripheral edge of said guide drum means so as to contact said tape and said end portions being spaced on opposite sides from said tip and aligned therewith to maintain the portion of the tape therebetween substantially straight.

2. A system as set forth in claim 1 wherein said guide means is mounted projectively on the peripheral edge of said rotary body and having the end portions near both sides of the tip of the magnetic head, the top of said guide means contacting said tape, said guide means having a height relative to said peripheral edge which increases progressively as the distance from said magnetic head decreases.

References Cited by the Examiner

UNITED STATES PATENTS

| | | | |
|---|---|---|---|
| 2,856,462 | 10/1958 | Lyon | 179—100.2 |
| 2,912,515 | 11/1959 | Lufcy | 179—100.2 |
| 3,024,319 | 3/1962 | Roberts et al. | 179—100.2 |
| 3,075,049 | 1/1963 | Gordon et al. | 179—100.2 |

FOREIGN PATENTS

| | | |
|---|---|---|
| 833,278 | 4/1960 | Great Britain. |

BERNARD KONICK, *Primary Examiner.*

IRVING L. SRAGOW, *Examiner.*